(12) United States Patent
Robertsson et al.

(10) Patent No.: US 7,219,793 B2
(45) Date of Patent: May 22, 2007

(54) APPARATUS, ARRANGEMENT AND METHOD FOR BRAKING

(75) Inventors: Staffan Robertsson, Kungsbacka (SE); Thomas Lumsden, Lerum (SE); Stavros Progoulakis, Göteborg (SE)

(73) Assignee: Flexlink Components AB (SE)

( * ) Notice: Subject to any disclaimer, the term of this patent is extended or adjusted under 35 U.S.C. 154(b) by 0 days.

(21) Appl. No.: 10/499,178

(22) PCT Filed: Dec. 20, 2002

(86) PCT No.: PCT/SE02/02417

§ 371 (c)(1),
(2), (4) Date: May 2, 2005

(87) PCT Pub. No.: WO03/062102

PCT Pub. Date: Jul. 31, 2003

(65) Prior Publication Data

US 2005/0224302 A1 Oct. 13, 2005

(30) Foreign Application Priority Data

Dec. 21, 2001 (SE) .................................. 0104357

(51) Int. Cl.
*B65G 35/08* (2006.01)
(52) U.S. Cl. ................. 198/795; 198/577; 198/867.13; 198/343.1; 198/465.1; 198/343.2; 198/465.2; 193/35 A; 188/40; 188/78; 188/82.8; 188/136; 188/336; 104/26.2

(58) Field of Classification Search .................. 188/40, 188/78, 82.8, 136, 336; 198/577, 795, 867.13, 198/343.1, 465.1, 343.2, 465.2; 193/35 A; 104/26.2

See application file for complete search history.

(56) References Cited

U.S. PATENT DOCUMENTS

| 2,039,187 A | * | 4/1936 | Reilly et al. ................ 188/336 |
| 3,797,406 A | | 3/1974 | Biessener |
| 4,605,121 A | | 8/1986 | Wahren |
| 5,044,475 A | * | 9/1991 | Clark ......................... 188/329 |
| 5,372,240 A | | 12/1994 | Weskamp |
| 5,579,695 A | | 12/1996 | Cockayne |

FOREIGN PATENT DOCUMENTS

GB    2 361 683 A    10/2001

* cited by examiner

*Primary Examiner*—Gene O. Crawford
*Assistant Examiner*—Leslie A. Nicholson, III
(74) *Attorney, Agent, or Firm*—Lerner, David, Littenberg, Krumholz & Mentlik, LLP

(57) ABSTRACT

A braking device for a pallet intended to run in a conveying track. The braking device includes a matrix and a braking element. The matrix includes the support service and exterior surface and a recess having various screws and openings. The braking element includes at least two protrusions which are disposed within the grooves of the matrix and project outwardly from the openings of the matrix at various stages of braking.

11 Claims, 2 Drawing Sheets

APPARATUS, ARRANGEMENT AND METHOD FOR BRAKING

TECHNICAL FIELD

The invention relates to a device for braking objects which are conveyed in a track, which device has a lateral surface arranged so as to slide along side surfaces of the track, and at least one support surface arranged so as to slide along a bottom surface of the track. The invention also relates to an arrangement for conveying, which comprises a track having a bottom surface, a first side surface and a second side surface and also at least a first upper surface and a second upper surface, the arrangement comprising at least one bearing means arranged so as to be moved along the upper surface and a braking device which is connected to the bearing means and arranged so as to be moved in the track between the side surfaces, which braking device has at least one lateral surface and at least one support surface. The invention also relates to a method for braking objects which are conveyed along a track comprising a bottom surface, a first side surface and a second side surface and also at least a first upper surface and a second upper surface, which comprises a braking device, which is arranged in between the objects in the track and connected to one of the objects, being subjected to pressure when the braking device strikes against an object.

BACKGROUND ART

Conveying devices, such as those which are used for moving objects between different stations in a factory, usually comprise a conveying track in the form of a belt or a chain. The conveying tracks can be sunken in a trench with vertical side surfaces. Alternatively, they can be located on the horizontal upper surfaces of the trench or arranged in some other way.

The objects to be conveyed are arranged slidably in relation to the conveying tracks, either directly or via bearing means, what are known as pallets.

When a pallet is conveyed along the conveying device and arrives at a work station, it is stopped by a stop. Performance of the work operation on the load on the pallet can then begin.

When it is difficult to coordinate the work so that every pallet spends the same length of time in each work station, there is a risk of a queue of pallets being formed before a work station. It is inappropriate for the braking of a pallet which takes place before a work station to take place solely by virtue of the pallet colliding with the pallet in front. If work is being carried out on the load on the pallet in front, there is a risk of the load being damaged.

Attempts have been made to solve this problem by providing the pallets with rubber shock absorbers.

It has nevertheless been found that this does not provide the necessary shock absorption, for which reason the problem remains to be solved in an effective manner.

U.S. Pat. No. 4,605,121 describes a braking device for braking objects on a conveying track which seeks to solve the abovementioned problem. The braking device is arranged in the form of elastic elements positioned between the objects or pallets they are to brake. Under the pressure which arises when a pallet behind is braked against the braking device, the latter is compressed in the conveying direction. This results in the device expanding transversely to the conveying direction. When this expansion takes place, the braking device will, on account of its dimensioning, bear against the vertical side surfaces of the conveying track. Owing to the friction which then arises between the braking device and the side surfaces, the pallet will be braked. However, the construction above affords limited possibilities for varying the braking effect. There is therefore a need for a braking device which can be varied to a greater extent with regard to the braking effect.

DISCLOSURE OF INVENTION

The problem above is solved by the invention by means of a construction in which the braking device comprises a matrix and a braking element which is arranged movably in the matrix and is arranged so that it can project through the lateral surface through openings arranged in the lateral surface, comprising a first opening which is arranged in that part of the braking device which, during operation, is arranged in the conveying direction of the conveying track and also a second opening and a third opening which are arranged in parts of the braking device which, during operation, are arranged essentially laterally in relation to the conveying direction, the braking element being arranged so as, in the unloaded state, to project through the lateral surface through the first opening, and the braking element being, in the loaded state, pressed inwards into the device at said opening and also pushed outwards through the lateral surface in the two other openings.

By virtue of providing a braking element which is movable in relation to the matrix, great degrees of freedom for varying the braking effect are obtained in relation to the possibilities which existed in the prior art. The braking effect can be varied considerably by means of different braking-element geometry. In the prior art, on the whole the only feature it is possible to vary in order to vary the braking effect is the nature of the rubber. By virtue of the invention, possibilities have therefore been afforded for significant variations in the braking effect of the braking device. On account of the geometry of the braking element, the braking device can be provided with an increased braking effect when the pallet is driven into from the rear, that is to say in the direction of travel concerned. If the braking element is then designed so that the outer surfaces which are to project through the lateral surface of the braking device are adapted to the curve of the lateral surface, the front part of these will project like barbs and increase the braking effect.

Another advantage of the device according to the invention is that, in the event of the bearing means forming a queue, it guides each bearing means separately so that they do not skew in the conveying track. This is due to the fact that the braking element projects laterally through the lateral surface of the braking device on both sides transversely to the conveying direction and in this way guides the advance of the bearing means.

The shape of the braking element preferably comprises two legs which are intended to project through the lateral surface of the braking device laterally in relation to the conveying direction in order to brake the bearing means to which the braking device is assigned. The braking element also comprises a leg which projects through the lateral surface of the braking device in the conveying direction and is intended to be pushed into the braking device in the event of collision.

In order to increase the area which can receive pressure in the event of a collision between the bearing means or pallets, that part of the braking element which is arranged so as to project through the lateral surface in the unloaded state can have a crosspiece. In order further to improve the functioning of the braking device, the crosspiece or, if the element does not have a crosspiece, that part of the braking element which projects through the lateral surface in the unloaded state can comprise a stiffening element.

The matrix of the braking device is preferably made from a rigid material. Examples of suitable materials are thermosetting plastic or metal.

The braking element is preferably made at least partly from an elastic material, such as rubber. The hardness of the rubber can be varied according to requirements. A preferred hardness range is between 80 and 90 Shore.

As mentioned, the braking effect can be varied by virtue of the geometric design of the braking element being varied. This can be brought about by means of, for example, the angle α between the parts which project when loading takes place. In order for the device to function, there must be a clearance between the area of the angle α on the braking element and the corresponding part on the matrix. The clearance, or the space, corresponds to the distance it is desired to move the part which projects in the unloaded state into the matrix. The clearance is also a parameter which influences the braking effect, as is the length of the part which projects in the unloaded state. The corresponding part of the matrix means that part of the matrix in which the two projecting parts of the braking element are arranged. The angle α is preferably between 20 and 40° preferably roughly 30°.

The invention also relates to an arrangement comprising a braking device as above. The arrangement comprises a track having a bottom surface, a first side surface and a second side surface and also at least a first upper surface and a second upper surface, the arrangement comprising at least one bearing means arranged so as to be moved along the upper surface. The braking device is connected to the bearing means and arranged so as to be moved in the track between the side surfaces. The arrangement according to the invention can comprise all the variations of the braking device described above.

According to one embodiment of the invention, the braking device also constitutes guide means for the bearing means. According to another embodiment, the arrangement comprises braking means separate from the guide means.

The invention also relates to a method for braking objects according to which braking elements arranged in the braking device are acted on by the pressure in such a way that parts of the braking element arranged in the conveying direction of the conveying track are pushed into the braking device and that, as a consequence of this, parts of the braking element are pushed out laterally from the braking device so that they come into contact with the side surfaces of the track, the objects being braked individually.

According to one embodiment of the invention, the method comprises the braking element partly projecting laterally through the lateral surface of the braking device in the unloaded state. According to an alternative embodiment, the method comprises the braking element not projecting laterally through the lateral surface of the braking device in the unloaded state.

The various embodiments described in connection with the braking device and the arrangement can also be applied to the method and vice versa.

DETAILED DESCRIPTION OF THE INVENTION

Figure 1:
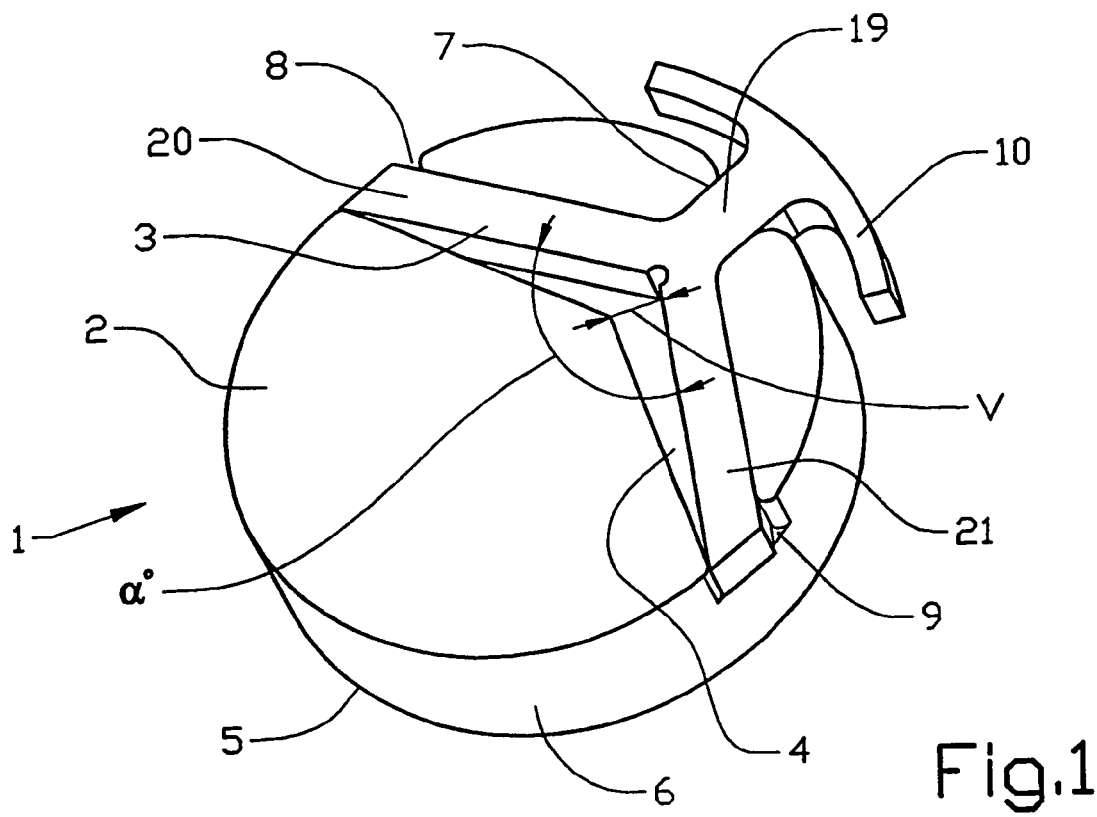
FIG. 1 shows a braking device according to the invention in the unloaded state.

FIG. 1 shows a braking device 1 according to the invention in the unloaded state. The braking device 1 has an essentially cylindrical shape. Other shapes are also conceivable for the braking device 1. The variations of the geometry are determined by the capacity of the braking device for following a conveying track. The braking device 1 comprises a matrix 2 made of a thermosetting plastic, such as acetal plastic, and a braking element 3 made of rubber, such as polyurethane rubber. The matrix 2 can be made of other relatively rigid materials, such as metal. The braking element 3 is preferably made from rubber, but other elastic materials are also possible. The whole of the braking element 3 does not have to be made from an elastic material. It is possible to envisage arranging stiffening elements made from, for example, metal or thermosetting plastic in the braking element.

The braking device 1 has a support surface 5 and a lateral surface 6. The braking element 3 is arranged movably in a recess in the matrix 2. The braking device 1 has a first opening 7, a second opening 8 and a third opening 9, through which parts 19, 20, 21 of the braking element 3 can project. These projecting parts 19, 20, 21 are also referred to as legs. The braking element 3 is essentially Y-shaped. That part 19 of the braking element 3 which, in the unloaded state, projects through the lateral surface 6 has a crosspiece 10. In the unloaded state, the crosspiece 10 is located at a distance from the lateral surface 6 of the braking device. In the unloaded state, the braking element does not project through the second opening 8 or the third opening 9 in the lateral surface 6, but through only the first opening 7. It is possible within the scope of the invention, however, to make provision for it to do so.

The recess 4 in the matrix 2 is arranged in such a way that there is a clearance V between the braking element 3 and the matrix in the area of the legs of the braking element. The legs of the braking element mean those parts of the braking element which are intended to project through the second opening and the third opening in the lateral surface 6 of the braking device when pressure is exerted against that part of the braking element which projects through the first opening 7. The legs have an angle α between them.

Figure 3:
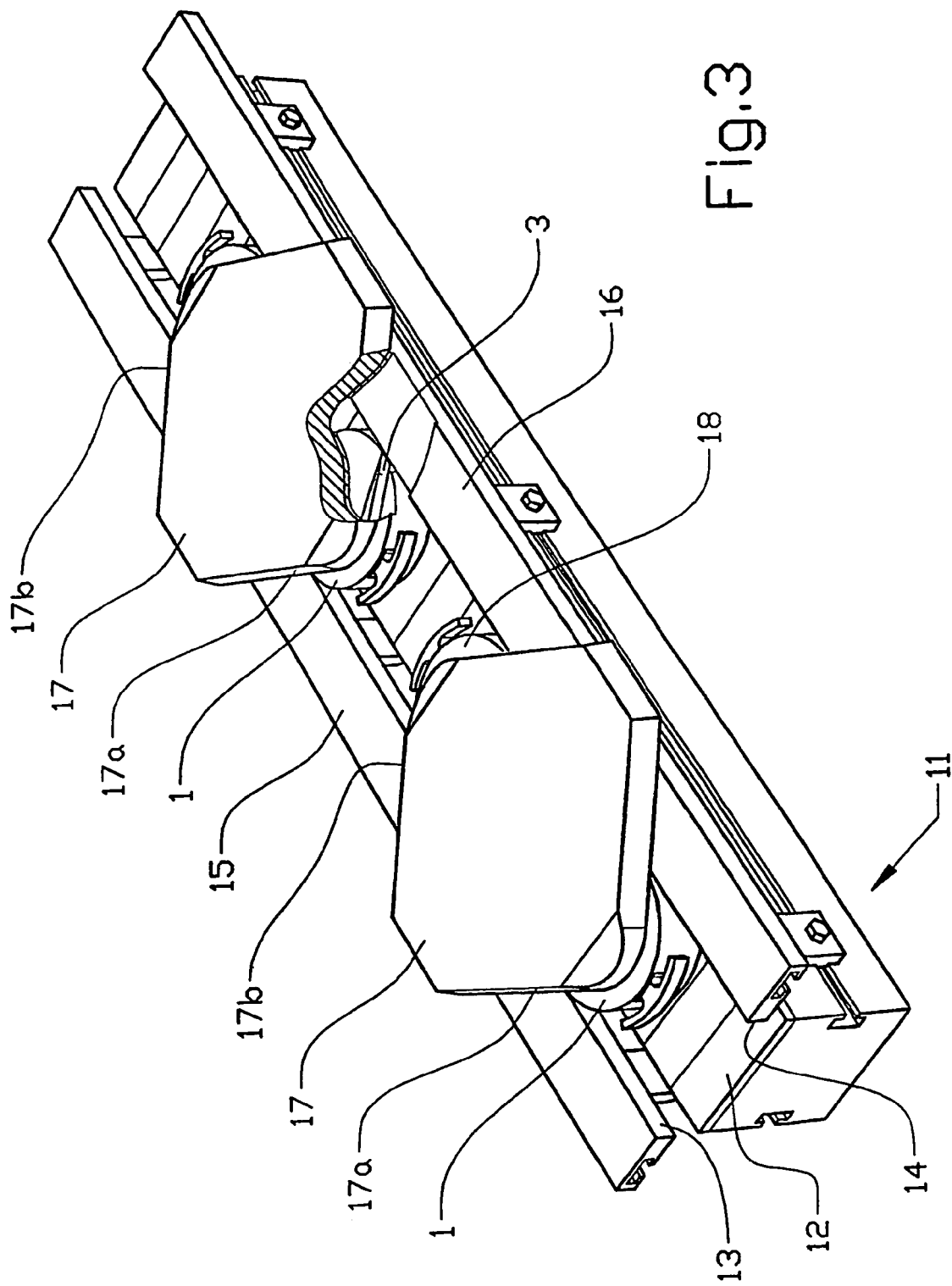
FIG. 3 shows a conveying arrangement according to the invention.

FIG. 3 shows an arrangement for conveying pallets according to the invention. The arrangement comprises a conveying track 11 having a bottom surface 12 which consists of a conveyor chain, a first side surface 13 and a second side surface 14 which consist of the side surfaces of two guide rails and also at least a first upper surface 15 and a second upper surface 16 which consist of the upper surfaces of the guide rails. Within the scope of the invention, the conveying track 11 can be designed in ways other than that described. Pallets 17 for conveying objects are arranged so as to be moved along the conveying track 11. Connected to and arranged below every pallet 17 is a braking device 1 arranged at each end 17a, 17b of the pallet. The braking devices 1 are arranged in the conveying direction of the conveying track. As the conveying direction can be two different directions, inwards or outwards in FIG. 3, two braking devices 1 are arranged on each pallet 17. Irrespective of the conveying direction, the braking functions in the same way. The braking devices 1 run in the conveying track 11. FIG. 3 shows the braking device covered by a cover 18. The cover 18 is intended to protect the braking device and can be omitted.

The first opening 7 of the braking device is arranged in that part of the lateral surface 6 of the braking device which, during conveying, is arranged in the conveying direction of the track 11. The second opening 8 and the third opening 9 of the braking device are arranged laterally on the lateral surface 6 of the braking device in relation to the conveying direction.

Figure 2:
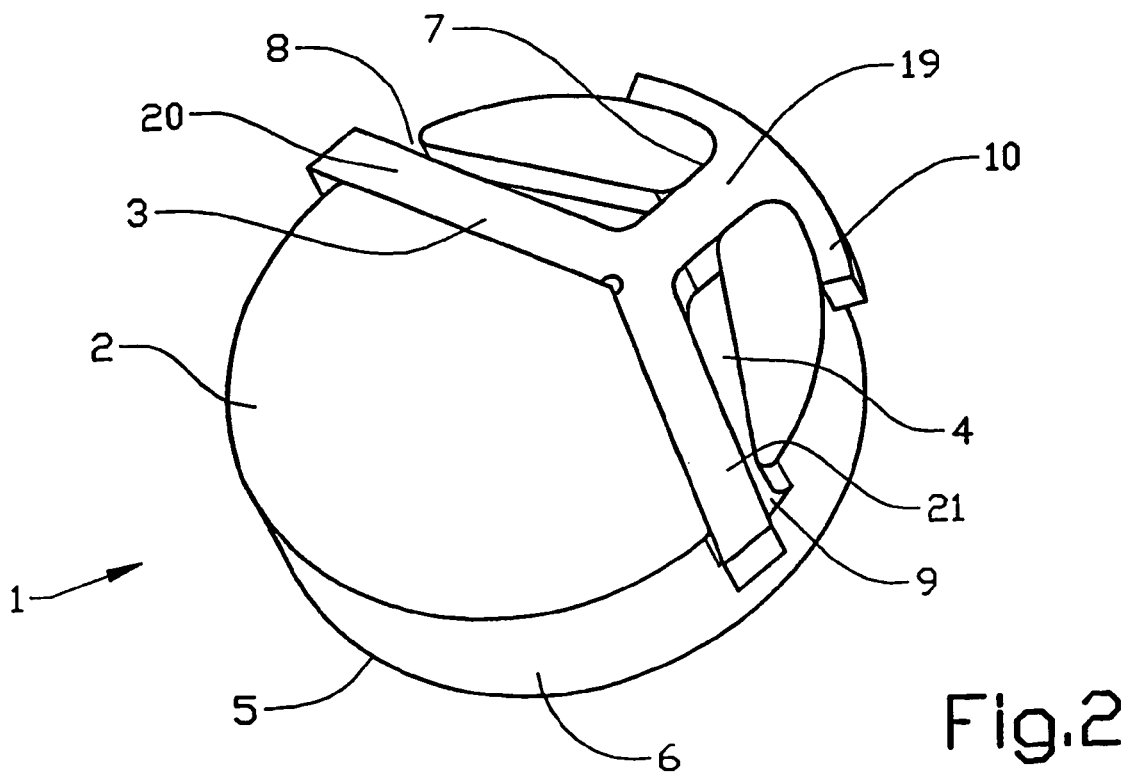
FIG. 2 shows a braking device according to the invention in the loaded state.

FIG. 2 illustrates what occurs when the braking element 3 is exposed to pressure in the event of a collision between pallets 17. When the braking element 3 connected to a pallet 17 strikes against the pallet 17 in front, the braking element 3 will be pushed into the braking device 1 in the conveying direction. When the pressure is transmitted through the braking element 3, the element 3 will project laterally through the second opening 8 and the third opening 9. The leg 20 of the element 3 will project through the opening 8, and the leg 21 will project through the opening 9. The projecting parts of the element 3 will come into contact with the side surfaces 13, 14 of the conveying track, and each pallet 17 will be braked individually.

FIG. 3 shows one of the pallets 17 partly in section so that the braking device 1 is visible. For the sake of clarity, the cover 18 is not drawn in full here. The braking action of the braking element 3 against the side surface 14 of the conveying track is illustrated here.

the invention claimed is:

1. A braking device for a pallet intended to run in a conveying track, the braking device comprising:
   a matrix having a support surface, an exterior surface and a recess, said recess having a first groove with a first opening, a second groove with a second opening and a third groove with a third opening, said first opening, said second opening and said third opening being positioned along said exterior surface; and
   a braking element including a first protrusion with a first end, a second protrusion with a second end and a third protrusion having a third end, wherein said first protrusion is at least partially disposed in said first groove and said first end extends outwardly from said first opening, wherein said second protrusion is at least partially disposed in said second groove such that said second end is adjacent said second opening, and said third protrusion being at least partially disposed within said third groove;
   wherein in an unloaded state said first end is remote from said first opening and said second end is proximate said second opening, and said third end of said protrusion is proximate said third opening;
   wherein in a loaded state said first end of said first protrusion moves proximate to said first opening and said second end of said second protrusion extends outwardly from said second opening and said third end of said third protrusion extends outwardly from said third opening such that said second end and said third end is engageable with a conveying track in which the braking device is disposed.

2. The braking device according to claim 1, wherein when the braking device is in said unloaded state said second end of said second protrusion and said third end of said third protrusion are disposed within said recess.

3. The braking device according to claim 1, wherein said first end includes a crosspiece.

4. The braking device according to claim 1, wherein said first protrusion extends in a same direction as the conveying track in which said braking device is disposed.

5. The braking device according to claim 1, wherein said matrix is made from a rigid material.

6. The braking device according to claim 1, wherein said braking element is made at least partially from an elastic material.

7. The braking device according to claim 6, wherein said elastic material is a rubber with a degree of hardness approximately between 80 and 90 Shore.

8. The braking device according to claim 1, wherein said second end and third end comprise a stiffening element.

9. The braking device according to claim 1, wherein said second groove and said third groove are separated by an angle which is approximately 30°.

10. An arrangement device for conveying product, the arrangement device comprising:
    a conveying track having a bottom surface, a first engagement surface, a second engagement surface, a first bearing surface and a second bearing surface;
    a bearing means for translating along said first bearing surface and said second bearing surface;
    a braking device attached to said bearing means and arranged so as to be moved along said conveying track between said first engagement surface and said second engagement surface, said braking device having a matrix with an exterior surface, which faces said first engagement surface and said second engagement surface, said matrix having a recess disposed therein, said braking device further having a braking element disposed within said recess, said braking element including a compression leg a first engagement leg and a second engagement leg, wherein when a pressure is exerted against said compression leg in a direction toward said bearing means said first engagement leg and said second engagement leg are caused to extend outwardly beyond said exterior surface of said matrix and engage said first engagement surface and said second engagement surface respectively.

11. The arrangement device according to claim 10, wherein said first engagement leg and said second engagement leg project outwardly from said exterior surface of said matrix when said braking device is in an unloaded state.

* * * * *